United States Patent [19]

Petersen et al.

[11] Patent Number: 4,537,384

[45] Date of Patent: Aug. 27, 1985

[54] IN-LINE CHECK VALVE HAVING COMBINED DOWNSTREAM POPPET SUPPORT AND FLOW CONTROL ELEMENTS

[75] Inventors: Oscar J. Petersen, Orange; Ross J. Barton, Costa Mesa; Jack E. Dalke, Whittier; Gerald W. Sheffield, Santa Ana; Theodore Towle, Huntington Beach, all of Calif.

[73] Assignee: Brunswick Corporation, Skokie, Ill.

[21] Appl. No.: 631,594

[22] Filed: Jul. 17, 1984

[51] Int. Cl.³ .................. F16K 31/44; F16K 17/20
[52] U.S. Cl. .................................. 251/83; 137/469; 251/12; 251/359
[58] Field of Search ............... 251/82, 83, 12, 322, 251/323, 359; 137/803, 469; 123/188 A

[56]  References Cited

U.S. PATENT DOCUMENTS

| 2,745,628 | 5/1956 | Carlson ............................ 251/83 |
| 3,199,532 | 8/1965 | Trick .............................. 137/469 |
| 3,329,154 | 7/1967 | Morse et al. ................. 137/469 X |
| 3,373,764 | 3/1968 | Munn ............................. 137/469 |
| 3,688,794 | 9/1972 | Bird et al. ...................... 251/82 X |
| 4,152,893 | 5/1979 | Wakita et al. ................ 137/469 X |

Primary Examiner—Larry Jones
Attorney, Agent, or Firm—Francis J. Lidd

[57] ABSTRACT

A poppet-type check valve utilizing an integral detachable flow control assembly for insertion into a cooperating housing. The checking poppet is oriented with its actuating stem, concentric guide, and concentric force bias spring downstream of the check flow controlled orifice. In a preferred embodiment, the flow control assembly is located internal of a housing having a first flow length adjacent the controlled flow orifice and seat, and a second converging flow length abutting said first flow length, and a terminating flow outlet adjacent the valve outlet port. When mounted internal of the preferred housing, the valve poppet assembly lies partially within the first flow area and extends a predetermined distance into the converging section, thereby greatly reducing turbulence and having a demonstrated reduction in medium flow pressure drop over presently used units.

7 Claims, 3 Drawing Figures

IN-LINE CHECK VALVE HAVING COMBINED DOWNSTREAM POPPET SUPPORT AND FLOW CONTROL ELEMENTS

BACKGROUND OF THE INVENTION

This invention relates generally to in-line fluid flow check valves or back flow preventers, and more particularly concerns an improved construction which positions the closure member support downstream of the checked orifice, thereby enhancing fluid flow capabilities through reduced pressure drop.

In-line poppet type check valves currently in use of the type disclosed in U.S. Pat. Nos. 2,918,083, and 2,928,416, employ poppet and/or cooperating seat constructions which during the non-check or flow condition, result in highly turbulent flow regimes downstream of the flow checked orifice. As those skilled in the art will readily recognize these highly turbulent regimes result in greatly increased pressure drop through the check valve, sometimes requiring an increase in diameter in order to achieve an acceptable flow characteristic in a given application.

The check valve of the invention disclosed here overcomes many of the pressure drop problems of currently used units, and demonstrates substantially decreased pressure drop or increased flow capability. The improvement demonstrated by the valve of this invention is achieved through positioning the poppet closure member, poppet stem support, and closure spring downstream of the checked orifice. Applicant has discovered that proper placement of the poppet and associated support elements adjacent the downstream flow areas establishes an elementary convergent/divergent flow passage resulting in substantially reduced pressure drop in the unchecked or open positions.

Accordingly, it is the object of this invention to provide an in-line poppet type check valve or back flow preventer wherein pressure drop through the valve in its unchecked or open position is substantially less than units in current use.

It is a further object of this invention to provide an in-line check valve utilizing a coaxial poppet closure member coacting with a seat seal wherein the seat seal is retained during high flow conditions by an angularly oriented seal groove.

It is a further object of this invention to provide an in-line check valve of the poppet type wherein the poppet stem support acts as an anti-turbulent baffle downstream of the checked orifice.

It is an additional object of this invention to integrate into the assembled valve a secondary sealing feature by metal-to-metal contact between the insert assembly and body.

DETAILED DESCRIPTION OF THE INVENTION

Figure 1:
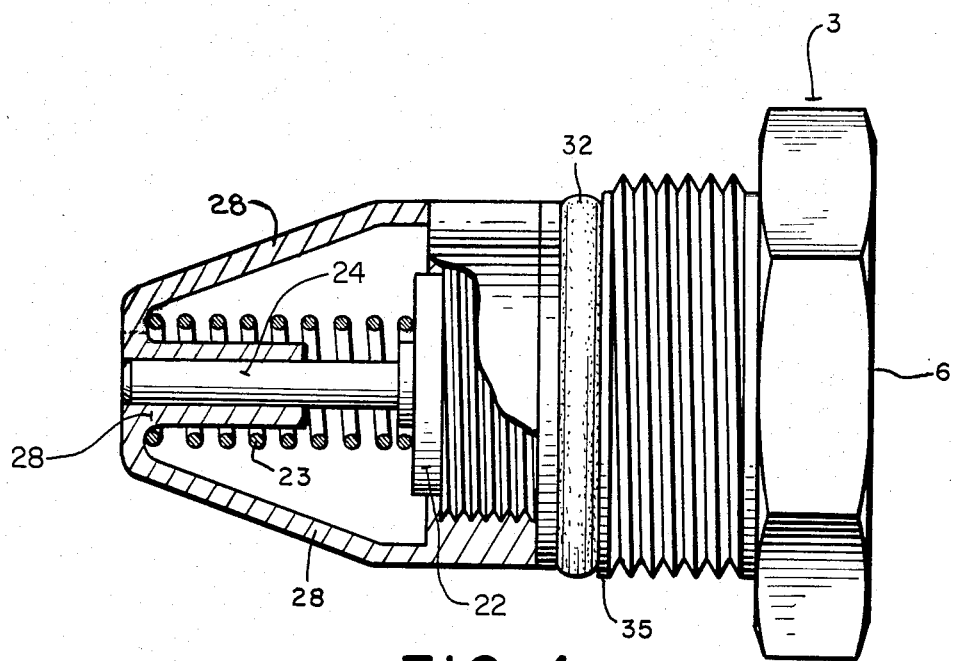
FIG. 1 is a sectional view of the check valve of the invention showing only the flow control insert assembly.
Figure 2:
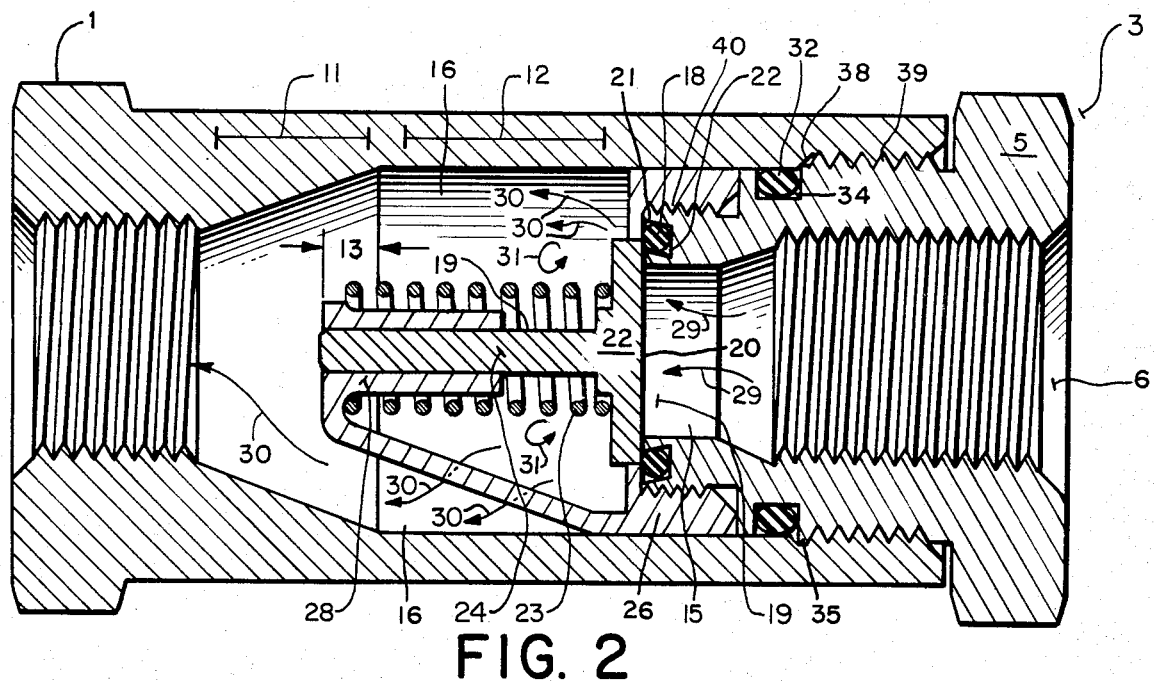
FIG. 2 is a sectional view of the check valve of the invention particularly showing the flow control insert positioned within a housing of the preferred embodiment. In the interest of clear disclosure, the upper flow control vane has been deleted.
Figure 3:
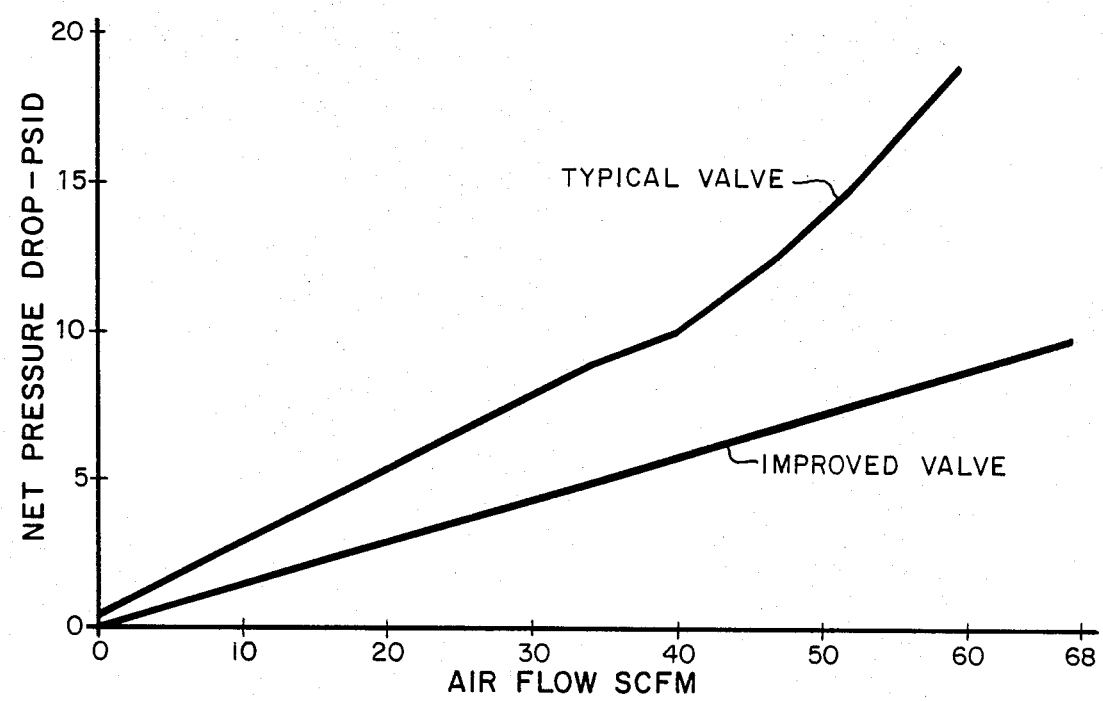
FIG. 3 is a performance curve of the check valve of the invention in the open or unchecked position, wherein pressure drop through the improved valve is compared to that of valves in current use.

Referring first to FIG. 2 with occasional reference to FIG. 1, the disclosed improved check valve comprises insert assembly 3 positioned internal of a preferred housing 1. The insert assembly 3 incorporates a flow inlet 6 in fluid communication with a flow orifice 15, having a circumferential seal 18 contained by an angularly disposed groove 22. Flow through the orifice 15 in the check position is controlled by an axially positioned poppet 19 having a poppet stem 24, and a poppet head 22. The poppet head 22 in check operation cooperates with the seal 18, thereby shutting off flow through the orifice 15 in the check or non-flow direction.

The poppet stem 24 reciprocates within the concentric poppet guide 28. The concentric guide 28 has outboard support in the form of a plurality of support vanes or flow baffles extending from the insert base to the further extension of the concentric guide. Typically, four vanes spaced ninety radial degrees are employed. A poppet closure spring 23 is contained intermediate the poppet head 22 and the opposite end of the concentric poppet guide 28.

Surrounding the poppet insert assembly particularly adjacent to the downstream extension of the poppet stem 24 and support vane or baffle 28, are the body first flow length 12 and abutting second flow length 11. In keeping with the invention disclosed, the downstream portion of the poppet concentric guide 28 is positioned so as to have a predetermined extension into or overlap 13 with the upstream portion of the converging or second flow length 11.

In non-check or flow operation, fluid entering the inlet 6, upon exceeding the pressure required to overcome the preset bias of poppet spring 23 due to force exerted on the upstream face 20 of the poppet 19, lifts the poppet head 22 from its sealing cooperation with seal 18 as positioned within angularly disposed or the oblique groove 21. Lift off the poppet head 22 from sealing engagement with seal 18 allows fluid flow through the orifice 15, along the direction of arrows 29 and into a relief flow passage generally shown as 16, in the direction of arrow 30. Applicant has discovered that the presence of the flow baffles 28, poppet stem 24, and bias spring 23, inhibit the formation of turbulent vortices 31 in the portions 11 and 12 of passage 16, resulting in substantially reduced pressure drop during flow conditions. Further, during non-check or flow conditions, the combination of first flow length or portion 12, and second flow length or portion 11, cooperate with the aforementioned support vanes 28 to establish an elementary convergent/divergent nozzle.

In either flow or check operation, containment of the valve internal fluid is greatly enhanced through the use of primary and secondary seals. As shown, a primary radial seal 32 is contained in a peripheral groove 34 located on the inlet adapter 5, intermediate first and second threaded portions, i.e. 39 and 40, respectively. Contained in the groove 34 is a static seal 32. The groove 34 has at its inlet end, a shoulder 35, abutting and terminating the internal end of the threaded section 39. As shown, in its assembled position the inlet adapter 5 is in interference abutment with connoidal section 38 of the housing 1. The sealing combination of peripheral seal 32 and cooperating surfaces 32 and 35 essentially eliminate any possibility of non-containment of valve internal fluid via leakage from pressurized fluids internal of the housing 1 upstream of the orifice 15, when the poppet 22 is operating in its check position (reference FIG. 2).

As it is apparent that there has been provided in accordance with the invention an In-Line Check Valve Having Combined Downstream Poppet Support and Flow Control Elements, that fully supplies the objects, aims and advantages set forth above. While the improved In-Line Check Valve has been described as a separate flow control and check element, and said flow control element in combination with a preferred convergent/divergent housing, it is evident that many alternatives, modifications, and variations will be apparent to those skilled in the art as a consequence of their comprehension of the foregoing description. Accordingly, it is intended that the invention as disclosed and claimed shall embrace all such alternatives, modifications, and variations as fall within the spirit and broad scope of the appended claims.

Therefore, we claim:

1. In an in-line check valve of the type employing an internal seat, and reciprocating spring biased poppet for preventing reverse flow through said seat, and allowing predetermined forward flow, the improvement comprising;
    an in-line housing having an internal concentric orifice;
    a seat seal circumferentially surrounding and partially embedded in said seat;
    an axially aligned poppet having a seal face cooperating with said seat seal for preventing flow therethrough;
    a stem on said poppet;
    a poppet support extending downstream from said orifice, defining a poppet guide;
    means mounting said poppet stem internal said guide for reciprocating motion therein;
    means mounting said poppet support in said housing thereby defining a first relief flow passage downstream said seat and a second flow passage extending therefrom, and a fluid containment chamber for poppet flow and check positions, respectively;
    said poppet support extending through said first flow passage and into said second flow passage;
    a compression spring concentric said poppet guide and intermediate said seal face and guide;
    means on said guide and poppet initially compressing said spring and establishing a predetermined poppet/seal force;
    wherein upstream pressure on said poppet seal face in excess of a predetermined value, on overcoming said poppet spring bias, translate said poppet downstream, thereby disengaging said poppet and seal, establishing flow through said passage and around said poppet stem guides.

2. The valve of claim 1 wherein said poppet support extends through said first flow length and partially into said second flow length.

3. The valve of claim 2, wherein said first flow length is essentially cylindrical and said second flow length is a truncated conoid.

4. The valve of claim 1 wherein said poppet support mounting means includes primary and secondary fluid containment seals.

5. The valve of claim 5 wherein said primary seal is a resilient "O"-ring and said secondary seal is achieved by metal-to-metal contact.

6. An in-line check valve comprising a valve housing having an internal concentric orifice for controlling flow therethrough, said housing defining a forward flow passage extending from said seat, said forward flow passage having a first flow length portion adjacent said orifice, and the second flow length portion disposed intermediate said first portion and valve outlet; and,
    a seat surrounding said orifice;
    a seat seal surrounding and partially embedded in said seat;
    an axially disposed poppet having a seal face cooperating with said seal in preventing flow therethrough in the check position;
    a stem on said poppet extending downstream from said seal face;
    a poppet support extending in said forward flow direction and defining a poppet stem guide;
    means mounting said poppet stem internal said guide for reciprocating motion therein;
    means mounting said poppet support in said first flow portion and extending therefrom into said flow portion;
    a compression spring, concentric said poppet guide and intermediate said seal face in the guide;
    means on said guide and poppet initially biasing said spring, thereby establishing a predetermined poppet seal force;
    wherein upstream pressure on said poppet seal face in excess of a predetermined value, overcomes said poppet spring bias, translating said poppet downstream, and disengaging said poppet and seal, and establishing flow through said orifice and flow passage.

7. The valve of claim 6 wherein said first flow length portion is essentially cylindrical and said second flow length is a truncated conoid.

* * * * *

UNITED STATES PATENT AND TRADEMARK OFFICE
CERTIFICATE OF CORRECTION

PATENT NO. : 4,537,384
DATED : August 27, 1985
INVENTOR(S) : O.J.Petersen,R.J.Barton,J.E.Dalke,G.W.Sheffield, and T. Towle.

It is certified that error appears in the above—identified patent and that said Letters Patent is hereby corrected as shown below:

Col. 2, line 12, change "22" to --- 21 ---.

Col. 4, line 13, change "claim 5" to --- claim 4 ---.

Signed and Sealed this

Fourth Day of March 1986

[SEAL]

Attest:

DONALD J. QUIGG

Attesting Officer

Commissioner of Patents and Trademarks